United States Patent Office
3,707,474
Patented Dec. 26, 1972

3,707,474
CERTAIN 4-(4-PYRIDYL)-5-HYDROXY-COUMARIN INTERMEDIATES
Raj K. Razdan, Belmont, Mass., and William R. Thompson, Ithaca, N.Y., assignors to Beecham Group Limited, Brentford, England
No Drawing. Application May 11, 1970, Ser. No. 36,466, which is a continuation-in-part of abandoned application Ser. No. 1,543, Jan. 8, 1970, which in turn is a continuation-in-part of abandoned application Ser. No. 866,743, Oct. 15, 1969, which also in turn is a continuation-in-part of abandoned application Ser. No. 630,-808, Apr. 14, 1967. Divided and this application June 26, 1970, Ser. No. 59,854
Int. Cl. C07d 31/34
U.S. Cl. 260—295 F                                  14 Claims

ABSTRACT OF THE DISCLOSURE

Novel chemical compounds and non-toxic acid addition salts thereof are disclosed wherein the compounds have the formulas:

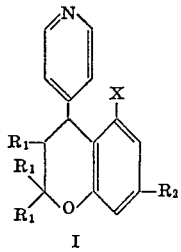 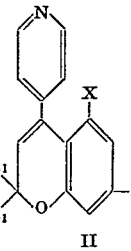 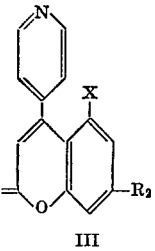

I  II  III in which
$R_1$ is lower alkyl having 1 to 6 carbon atoms,
$R_2$ is alkyl having 1 to 20 carbon atoms or cycloalkyl-lower-alkyl, the cycloalkyl part having 3 to 8 carbon atoms, and
X is OH or a pharmaceutically acceptable salt including an alkali metal salt, or an ether or ester of the OH-group, exclusive of amino acid esters.

Compounds I and II possess beneficial pharmacodynamic activity with respect to the cardiovascular and central nervous system, and compounds III are intermediates for use in the preparation of compounds I and II.

CROSS-REFERENCE TO RELATED APPLICATIONS

This application is a divisional of our copending application, Ser. No. 36,466 filed May 11, 1970, now abandoned, which in turn is a continuation-in-part of application Ser. No. 1,543 filed Jan. 8, 1970, now abandoned, which in turn is a continuation-in-part of application Ser. No. 866,743 filed Oct. 15, 1969, now abandoned, which in turn is a continuation-in-part of application, Ser. No. 630,808 filed Apr. 14, 1967, now abandoned.

The present invention relates to the new chemical compounds I and II:

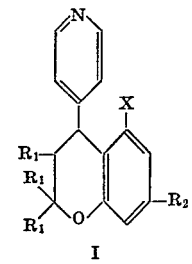 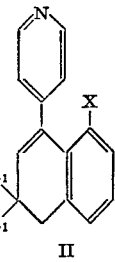 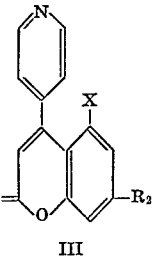

I  II  III and non-toxic acid addition salts thereof, wherein $R_1$ is lower alkyl having 1 to 6 carbon atoms,
$R_2$ is alkyl having 1 to 20 carbon atoms or cycloalkyl-lower-alkyl, the cycloalkyl part having 3 to 8 carbon atoms, and
X is OH or a pharmaceutically acceptable salt including an alkali metal salt or an ether or ester of the OH-group, exclusive of amino acid esters, which are useful as antidepressants and anti-anxiety agents and which are non-toxic when administered orally or parenterally, and non-toxic acid addition salts of said compounds. Compounds III are valuable coumarin intermediates for I and II.

Extensive work has been carried out in synthesizing pharmacodynamically active chemical compounds to find non-toxic compounds which will produce certain desired results on the cardiovascular and central nervous system without complete success.

It is, therefore, a major object of this invention to provide novel compounds I and II which possess pharmacodynamic activity with respect to hypertension and analgesia, and which are useful as antidepressants and anti-anxiety agents. It is another object to provide compounds of the character described which exhibit low toxicity and which may be nondependence-providing drugs. A further object resides in solubilized derivatives of the 5-OH group when X=OH.

This invention resides in the chemical compounds I and II which are herein designated as 2,2,3-tri-lower-alkyl-7-alkyl - (and 7 - cycloalkyl - lower - alkyl - )4 - (4-pyridyl) - 5 - chroman - ols, and 2,2 - di - lower - alkyl-7 - alkyl - (and 7 - cycloalkyl - lower - alkyl - )4 - (4-pyridyl) - 2H - chromen - 5 - ols and their alkali metal, acid addition and other pharmaceutically acceptable salts, and ether and ester derivatives thereof, excluding amino acid esters.

Illustrative embodiments of the invention are those of Formulas I and II respectively:

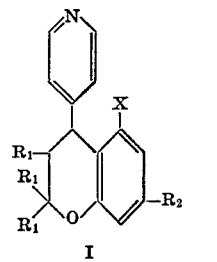 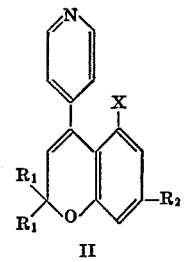

I  II wherein $R_1$, $R_2$ and X have the above stated meanings. Compound II in which $R_1$=methyl, $R_2$=methyloctyl and X=OH or ONa represents a preferred and best mode exemplification of the invention.

The term "lower-alkyl" as used to define $R_1$ means saturated, monovalent aliphatic radicals, including straight and branched-chain radicals of from one to six carbon atoms, as illustrated by methyl, ethyl, propyl, isopropyl, butyl, sec.-butyl, amyl and hexyl.

The term "alkyl" as used to define $R_2$ means saturated, monovalent aliphatic radicals, including straight and branched-chain radicals of from one to twenty carbon atoms, as illustrated by methyl, ethyl, propyl, n-butyl, n-amyl, n-hexyl, 2-heptyl, n-heptyl, 3-methyl-2-octyl, n-octyl, nonyl, tetradecyl, n-hexadecyl, eicosanyl, and the like, and the term "cycloalkyl" means cyclic, saturated aliphatic radicals of from three to eight carbon atoms, as illustrated by cyclopropyl, cyclobutyl, 2-methylcyclobutyl, cyclohexyl, 4-methylcyclohexyl, cyclooctyl, and the like.

X as used herein means preferably OH but includes salts such as —ONa or —OK or other pharmaceutically acceptable salts and esters (other than amino acid esters) and ethers of the OH-group such as alkyl ethers, amino- and alkylaminoethers exemplified by diethylaminoethyl, esters of alkanoic acids such as acetic acid and inorganic acids such as phosphoric acids and mono-esters of poly- basic acids such as succinic acid.

The invention further resides in the chemical compounds (III) which are herein designated as 5-X-7-alkyl- (and 7 - cycloalkyl - lower - alkyl - )4 - (4 - pyridyl) coumarins having the formula:

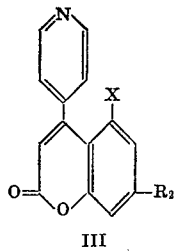

III wherein $R_2$ and X have the meanings given above, and which are useful as intermediates in the preparation of the compounds of Formulas I and II.

Compounds of Formula I (X=OH) may be prepared by reacting a 5-hydroxy-7-alkyl-(and 7-cycloalkyl-lower-alkyl-)4-(4-pyridyl) coumarin, illustrated above by Formula III (X=OH) with a lower alkyl magnesium halide to produce a 2,2,3-tri-lower-alkyl-7-alkyl (and 7-cycloalkyl-lower-alkyl-)4-(4-pyridyl)-5-chromanol of Formula I (X=OH). The reaction is carried out in an organic solvent which is inert under the conditions of the reaction. Suitable solvents are diethyl ether, dibutyl ether, tetrahydrofuran, anisole, pyridine, and the like. It is preferred to add a solution of the 5-hydroxy-7-alkyl-(and 7-cycloalkyl-lower-alkyl-)4-(4-pyridyl) coumarin in anisole solution to a solution of the Grignard reagent in anisole. The reaction is carried out at an elevated temperature, preferably at 100° C. for an extended period of time, e.g., at least 24 hours.

Compounds of Formula II (X=OH) may be prepared by reacting a 5-hydroxy-7-alkyl-(and 7-cycloalkyl-lower-alkyl-)4-(4-pyridyl) coumarin, illustrated above by Formula III (X=OH), with a lower alkyl magnesium halide to produce a 2,2-di-lower-alkyl-7-alkyl-(and 7-cycloalkyl-lower-alkyl-)4-(4-pyridyl)-2H-chromen-5-ol of Formula II (X=OH). The reaction is carried out in an organic solvent as described above and in the same manner except that the reaction temperature is maintained at a lower level.

The preparation of the coumarin intermediates of Formula III (X=OH) may be carried out, for example, by reacting methyl-β-oxo-4-pyridine-propionate with a 5 - alkyl - (and 5 - cycloalkyl - lower - alkyl-)resorcinol to produce a 5-hydroxy-7-alkyl-(and 7-cycloalkyl-lower-alkyl-)4-(4-pyridyl) coumarin of Formula III (X=OH). The reaction is carried out in a mixture of concentrated sulfuric acid and phosphorus oxychloride, or in the presence of other condensation agents such as aluminum chloride, hydrogen chloride, and polyphosphoric acid, and is illustrated by the equation:

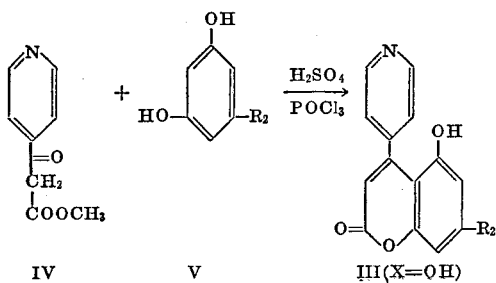

IV     V     III(X=OH)

wherein $R_2$ is as defined above.

The resulting 5-hydroxy-7-alkyl-(and 7-cycloalkyl-lower-alkyl)4-(4-pyridyl) coumarins are preferably isolated by the addition of a base to the reaction mixture to convert the salt to the free base.

Instead of methyl - β - oxo-4-pyridine-propionate, there can be used the corresponding ethyl or other lower alkyl compound of 1 to 6 carbon atoms.

The intermediate methyl - β - oxo - 4 - pyridine-propionate of Formula IV is conveniently prepared according to the procedure of Moffat described in J. Med. Chem. 7, 449 (1964), and the intermediate 5-alkyl-(and 5-cycloalkyl - lower - alkyl) resorcinols of Formula V are conveniently prepared according to procedure of Adams, Mackenzi and Loewe described in J. Am. Chem. Soc., 70, 669 (1948).

Due to the ionic nature of the nitrogen in the pyridine ring of Formulas I and II, it is possible to form acid addition salts such as those of HCl, HBr, HI and picric acid [$(NO_2)_3C_6H_2OH$]. The compounds of Formula I and II may be converted to the acid addition salt form by dissolving the compound in an aqueous solution containing the appropriate acid and isolating the salt by evaporating the solution.

It will thus be appreciated that each of Formulas I and II not only represents the structural configuration of our invention as shown, but each is also representative of the respective structural entity which is common to all of our respective compounds of Formulas I and II whether in the form as illustrated or in the form of the acid salts or other derivatives. They also include geometric and optical and stereo isomers. We have found that by virtue of this common structural entity, these compounds and their acid addition salts or other derivatives have inherent pharmacodynamic activity of a type to be more fully described hereinbelow. This inherent pharmacodynamic activity can be enjoyed in useful form for pharmaceutical purposes by employing the compounds themselves or the acid addition salts or other derivatives formed from pharmaceutically-acceptable acids or esters of strong acids, that is, acids or esters whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, we use pharmaceutically-acceptable non-toxic salts. Although enhanced water-insolubility, increased toxicity, or lack of crystalline character may make some particular salt species less suitable or less desirable for use as such in a given pharmaceutical application, the water-insoluble or more toxic salts can be converted to pharmaceutically-acceptable compounds by techniques well known in the pharmaceutical art.

It will be appreciated from the foregoing that all of the acid addition salts of our new compounds are useful and valuable compounds regardless of considerations of solubility, toxicity, physical form, and the like, and accordingly are within the purview of the instant invention.

Compounds in which X is an esterified derivative of the hydroxy group, exclusive of amino acid esters which form no part of this invention, may be formed by the reaction of compounds in which X is OH or a reactive derivative thereof such as a metal salt with an esterifying acid or a reactive derivative thereof such as an acid halide or anhydride. The acid may be mono- or poly-basic and organic or inorganic. Examples include acetic acid, succinic acid, phosphoric acid, carbonic acid and carbamic acid.

Compounds in which X is an etherified derivative of the hydroxyl group, including simple ethers broadly, may be formed by the reaction of reactive derivatives of the etherifying group with a compound in which X is OH or a reactive derivative thereof such as a metal salt. Thus, for example, an alkyl halide may be reacted with a compound in which X is ONa to produce an alkyl ether. The etherified derivatives may have further substituents especially acid or basic groups. Furthermore, a residue of a polybasic acid will have free acid groups and these may themselves be in the form of salts; e.g., the sodium salt of a hemisuccinoyl ester or an alkali metal salt of a dihydrogen phosphate residue. In the case of ethers, primary, secondary or tertiary amino groups may also be persent as in, for example, a diethylaminoethyl ether. In the case of the tertiary amino groups, the groups attached to the nitrogen atom may be linked to each other or through further hydrogen atoms to form heterocyclic groups including the nitrogen of the amino group to which they are both attached.

The basic groups such as amino groups may be in the form of salts with acids.

The derivatives of the hydroxyl group may be chosen to modify the physical or chemical properties of the compound. Thus, for example, while many compounds in which X is OH are found to be sparingly soluble in aqueous media or virtually insoluble, a compound of the formula:

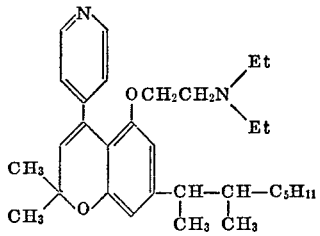

was found to be freely soluble in dilute hydrochloric acid and the hydrochloric acid salt was soluble in water.

The derivatives are selected or chosen to have acceptable pharmaceutical properties, especially low toxicity.

Preparation of the derivatives of the OH group is conveniently performed using the chroman or chromen derivatives of Formulas I and II but in some cases the OH derivative may be formed at an earlier stage in the preparation, for example, using the coumarin of Formula III. Clearly the nature of the derivative will determine whether it will survive the later stages of the preparation. Thus, for example, etherified derivatives will often be stable while esterified derivatives may be hydrolyzed back to the OH group.

In the preparation of some derivatives modified procedures may be found preferable. For example, in the preparation of phosphate derivatives of compounds in which X is OH, a reaction scheme as outlined below may be employed:

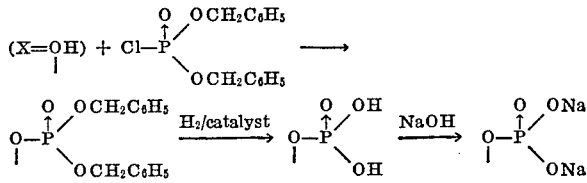

The compounds of Formulas I and II have been shown to possess central nervous system activity as evidence by gross overt changes induced by parenteral and oral administration in mice and rats in standard tests involving observations of psychomotor activity, reactivity to stimuli, and ability to perform normal, non-conditioned motor tasks. The compounds also show activity in a number of conditioned behavioral tests in monkeys. This activity indicates their usefulness as psychotropic agents. In addition, certain of the compounds produce depressor reponse in cat blood pressure studies.

The compounds can be prepared for use by dissolving under sterile conditions a salt form of the compounds in water (or an equivalent amount of a non-toxic acid if the compounds of Formulas I and II are used), or in a physiologically compatible aqueous medium such as saline, and stored in ampoules for intramuscular injection. Alternatively, they can be incorporated in unit dosage form as tablets or capsules for oral administration either alone or in combination with suitable adjuvants or excipients such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared.

The molecular structures of the compounds of our invention were assigned on the basis of a study of their infrared, ultraviolet and NMR spectra, of mass spectrometry and their transformation products; and they were confirmed by the correspondence of calculated and found values for the elementary analyses for representative examples.

The invention is further illustrated by the following non-limitative examples of which Example 3 represents a preferred embodiment.

EXAMPLE 1

5-hydroxy-7-(3-methyl-2-octyl)-4-(4-pyridyl) coumarin

To a mixture of 2.1 g. (0.0117 mole) of methyl-$\beta$-oxo-4-pyridine-propionate and 2.8 g. (0.0118 mole) of 5-(3-methyl-2-octyl) resorcinol was added dropwise with cooling 5 ml. of concentrated sulfuric acid. The mixture was then treated all at once with 3 ml. of phosphorus oxychloride and the viscous solution was stirred at room temperature for 48 hours. It was then poured into cold potassium bicarbonate solution and extracted with ether several times. The combined ether extract was washed, dried and evaporated to leave a yellow solid which was recrystallized from dilute ethanol to give 3.4 g. of 5-hydroxy-7-(3-methyl-2-octyl)-4-(4-pyridyl) coumarin. The compound had a melting point of 191–194° C. and showed an ultraviolet absorption at 315 m$\mu$.

$$\lambda_{max}^{EtOH}\ 11,700$$

Analysis.—Calc. for $C_{22}H_{27}O_3N$ (percent): C, 75.59; H, 7.45; N, 3.83. Found (percent): C, 75.42; H, 7.43; N, 3.76.

EXAMPLE 2

2,2,3-trimethyl-7-(3-methyl-2-octyl)-4-(4-pyridyl)-5-chromanol

Methyl bromide was bubbled into a stirred mixture of 18.0 g. (0.75 mole) of magnesium and dry ether under nitrogen until all the magnesium had dissolved. The ether was then distilled and simultaneously replaced with dry anisole maintaining constant volume. After all the ether had been removed, 27.6 g. (0.075 mole) of the 5-hydroxy - 7 - (3 - methyl - 2-octyl)-4-(4-pyridyl) coumarin of Example 1 in anisole solution was added dropwise. When addition was complete the mixture was stirred and heated at 100° C. for 2 days. The mixture was poured into a large excess of 4N sulfuric acid and steam-distilled to remove anisole. The residue was extracted with ether, washed, dried and evaporated to leave a reddish oil. This was dissolved in 250 ml. of heptane, 5 ml. of 48% hydrobromic acid was added, and the mixture was then refluxed for 6 hours. After cooling the heptane was removed on a rotary evaporator and the residue was extracted with ether. The ethereal extract was washed with sodium bicarbonate solution, then with water and dried over sodium sulfate. On evaporation of the ether, a gummy residue was obtained which crystallized on trituration with acetonitrile to give 6.0 of 2,2,3-trimethyl-7-(3-methyl-2-octyl) - 4 - (4 - pyridyl) - 5 - chromanol of M.P. 192–195° C.

Analysis.—Calc. for $C_{26}H_{37}O_2N$ (percent): C, 78.94; H, 9.43; N, 3.54. Found (percent): C, 78.80; H, 9.38; N, 3.47.

EXAMPLE 3

2,2-dimethyl-7-(3-methyl-2-octyl)-4-(4-pyridyl)-2H-chromen-5-ol

A solution of 5.0 g. (0.0137 mole) of the 5-hydroxy-7-(3-methyl-2-octyl)-4-(4-pyridyl) coumarin of Example 1 in anisole was added dropwise to a solution of methyl magnesium bromide (prepared from 3.3 g. (0.138 mole) of magnesium as described in the previous example) in anisole. When the addition was complete the mixture was stirred and heated at 50° C. for 16 hours. After working up in a similar manner as described in Example 2, a solid was obtained which was recrystallized from acetonitrile to give 2.9 g. of 2,2-dimethyl-7-(3-methyl-2-octyl)-4-(4-pyridyl)-2H-chromen-5-ol of M.P. 85–90° C. It showed ultraviolet absorption at 263 m$\mu$.

$$\lambda_{max.}^{EtOH}\ 10,000$$

*Analysis.*—Calc. for $C_{26}H_{37}O_2N$ (percent): C, 78.94; H, 9.43; N, 3.54. Found (percent): C, 78.80; H, 9.38; N, 3.47.

EXAMPLE 4

5-hydroxy-7-methyl-4-(4-pyridyl) coumarin

To a mixture of 5.4 g. of methyl-$\beta$-oxo-4-pyridinepropionate and 3.75 g. of resorcinol was added dropwise with cooling, 15 ml. of concentrated sulfuric acid. The mixture was then treated all at once with 6 ml. of phosphorus oxychloride and the viscous solution was stirred at room temperature for 16 hrs. and then poured into ammonium hydroxide solution containing ice and the pH adjusted to neutral with potassium bicarbonate solution. A fine precipitate was obtained which was filtered, and recrystallized from boiling ethanol to give 6.5 g. of 5-hydroxy - 7 - methyl - 4 - (4-pyridyl) coumarin of M.P. 304–306° C.

*Analysis.*—Calc. for $C_{15}H_{11}NO_3\cdot\frac{1}{2}H_2O$ (percent): C, 68.7; H, 4.58; N, 5.35. Found (percent): C, 68.62; H, 4.63; N, 5.42.

It showed ultraviolet absorption at 314 m$\mu$ $$\lambda_{max.}^{EtOH}\ 10,280$$

The structure was confirmed by NMR analysis to be:

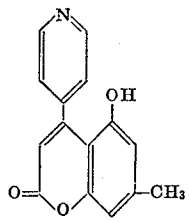

EXAMPLE 5

2,2,7-trimethyl-4-(4-pyridyl)-2H-chromen-5-ol

A suspension of 2 g. of 5 - hydroxy - 7 - methyl - (4-pyridyl) coumarin in anisole was added in small portions to a solution of methyl magnesium bromide (prepared from 1.9 g. of magnesium as described in Example 2) in anisole. When the addition was complete, the mixture was stirred and heated at 50° C. for 16 hrs. After workup in a similar manner as described in Example 2, a solid was obtained which was recrystallized from methanol/acetonitrile mixture to give 0.7 g. of 2,2,7-trimethyl-4-(4-pyridyl)-2H-chromen-5-ol of M.P. 240–245° C.

*Analysis.*—Calc. for $C_{17}H_{17}O_2N$ (percent): C, 76.38; H, 6.41; N, 5.24. Found (percent): C, 76.20; H, 6.31; N, 5.42.

The structure was confirmed by NMR analysis to be:

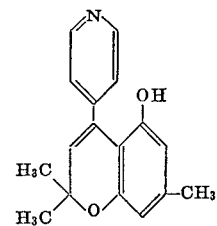

EXAMPLE 6

7-n-heptyl-5-hydroxy-4-(4-pyridyl) coumarin

To a mixture of ethyl isonicotinoylacetate (21.1 g., 0.11 mole) and 5-n-heptylresorcinol (22.76 g., 0.11 mole) was added concentrated sulfuric acid (46 ml.) followed by phosphorus oxychloride (28 ml.), the mixture being cooled during the addition. After stirring for 24 hours, the brown oil was poured into a stirred solution of sodium bicarbonate and the resulting yellow gum was extracted into chloroform. After drying, removal of the solvent gave a yellow solid which crystallized from aqueous ethanol to give 7-n-heptyl-5-hydroxy-4-(4-pyridyl) coumarin (23.45 g., 68%), M.P. 164–166° C.

$$\lambda_{max.}^{EtOH}\ 317\ m\mu,\ \epsilon=11,170$$

*Analysis.*—Calc. for $C_{21}H_{23}NO_3$ (percent): C, 74.75; H, 6.9; N, 4.15. Found (percent): C, 75.0; H, 7.1; N, 4.3.

EXAMPLE 7

2,2-dimethyl-7-n-heptyl-4-(4-pyridyl)-2H-chromen-5-ol

A solution of 7-n-heptyl - 5 - hydroxy-4-(4-pyridyl) coumarin (20.22 g., 0.06 mole) in dry benzene (400 ml.) was added dropwise to a solution of methyl magnesium bromide (prepared from magnesium (14.58 g., 0.6 g. atom) and methyl bromide in ether (400 ml.). When addition was complete, the mixture was refluxed for 2 hours, cooled and poured into saturated ammonium chloride solution (2 l.) with stirring. The organic layer was separated, washed, dried and evaporated to give a brown oil which solidified (18.1 g., M.P.~60° C.). This material was refluxed in glacial acetic acid for 2 hours, and then the solution was poured into water (1 l.) with stirring. The solid which separated was extracted into ether and the extract washed with sodium bicarbonate solution and water. After drying, removal of the solvent gave a brown gum which, on crystallization from aqueous acetonitrile (charcoal) gave 2,2 - dimethyl-7-n-heptyl-4-(4-pyridyl)-2H-chromen-5-ol (6.76 g., 32%), M.P. 154–155° C.

$$\lambda_{max.}^{EtOH}\ 264\ m\mu,\ \epsilon=9280$$

*Analysis.*—Calcd. for $C_{23}H_{29}NO_2\cdot\frac{1}{2}H_2O$ (percent): C, 76.7; H, 8.3; N, 3.9. Found (percent): C, 76.6; H, 8.35; N, 3.9.

EXAMPLE 8

5-hydroxy-7-n-pentyl-4-(4-pyridyl) coumarin

To a mixture of ethyl isonicotinoylacetate (26.8 g., 0.139 mole) and 5-n-pentylresorcinol (25 g., 0.139 mole) was added concentrated sulfuric acid (60 ml.) and phosphorus oxychloride (36 ml.) at 0–5° C. After stirring for 20 hours at room temperature, working up as in Example 4 gave 5-hydroxy-7-n-pentyl-4-(4-pyridyl) coumarin (32.0 g., 72%, M.P. 182–184° C. as yellow crystals ex aqueous ethanol.

$$\lambda_{max.}^{EtOH}\ 317\ m\mu$$

*Analysis.*—Calcd. for $C_{19}H_{19}NO_3$ (percent): C, 73.8; H, 6.15; N, 4.5. Found (percent): C, 73.6; H, 6.3; N, 4.4.

EXAMPLE 9

2,2-dimethyl-7-n-pentyl-4-(4-pyridyl)-2H-chromen-5-ol

A solution of 5-hydroxy-7-n-pentyl - 4 - (4 - pyridyl) coumarin (5.0 g., 0.016 mole) in dry benzene (100 ml.) was added dropwise to a solution of methyl magnesium bromide [from magnesium (3.84 g., 0.16 g. atom) and methyl bromide in ether (100 ml.)]. Following the procedure outlined in Example 7, there was obtained 2,2-dimethyl-7-n-pentyl-4-(4 - pyridyl)-2H-chromen-5-ol (2.01 g., 39%), M.P. 173–174° C. ex acetonitrile-methanol (charcoal).

$\lambda_{max.}^{EtOH}$ 264 m$\mu$

Analysis.—Calcd. for $C_{21}H_{25}NO_2$ (percent): C, 78.0; H, 7.7; N, 4.3. Found (percent): C, 78.0; H, 8.0; N, 4.3.

EXAMPLE 10

2,2,3-trimethyl-7-n-pentyl-4-(4-pyridyl)-chroman-5-ol 5-hydroxy-7-n-pentyl-4-(4-pyridyl) coumarin (21.7 g., 0.07 mole) in dry anisole (100 ml.) was added dropwise over 30 minutes to methyl magnesium bromide in anisole (150 ml.) prepared as described in Example 2 from magnesium (16.8 g., 0.7 g. atom) and methyl bromide in ether (300 ml.), followed by displacement of ether. After heating at 100° C. for 48 hours, the mixture was poured into excess 4 N sulfuric acid and steam distilled to remove the anisole. The residue was extracted into ether, washed, dried and evaporated to give an oil which was then refluxed in glacial acetic acid for 3 hours. After pouring into water, extraction with ether, and washing with sodium bicarbonate solution, an oil (11.8 g.) was obtained from which a solid (4.3 g.), M.P. 202–204° C. was obtained by sublimation at 200° C./0.2 mm. Two crystallizations from acetonitrile afforded 2,2,3-trimethyl-7-n-pentyl-4-(4-pyridyl)-chroman-5-ol (2.8 g., 11.5%), M.P. 210–211° C.

Analysis.—Calcd. for $C_{22}H_{29}NO_2$ (percent): C, 77.8; H, 8.6; N, 4.1. Found (percent): C, 78.05; H, 8.9; N, 3.9.

EXAMPLE 11

5-hydroxy-7-n-nonyl-4-(4-pyridyl) coumarin

To a mixture of ethyl isonicotinoylacetate (9.6 g., 0.05 mole) and 5-n-nonylresorcinol (11.8 g., 0.05 mole) was added concentrated sulfuric acid (30 ml.) and phosphoryl chloride (20 ml.) at 0–5° C. The mixture was stirred for 17 hours at room temperature and worked up as in Example 4 to give 5 - hydroxy-7-n-nonyl-4-(4 - pyridyl) coumarin (9.2 g., 51%), M.P. 154–155° C. ex aqueous ethanol.

Analysis.—Calcd. for $C_{23}H_{27}NO_3$ (percent): C, 75.6; H, 7.45; N, 3.8. Found (percent): C, 75.7; H, 7.7; N, 3.8.

EXAMPLE 12

2,2-dimethyl-7-n-nonyl-4-(4-pyridyl)-2H-chromen-5-ol

A solution of 5 - hydroxy - 7 - n - nonyl-4-(4-pyridyl) coumarin (18.25 g., 0.05 mole) in dry benzene (300 ml.) was added dropwise to a stirred solution of methyl magnesium bromide (0.5 mole) in dry ether (100 ml.). Following the procedure outlined in Example 7 there was obtained 2,2-dimethyl-7-n-nonyl-4-(4-pyridyl)-2H-chromen-5-ol (8.32 g., 44%), M.P. 148–149° C. (acetonitrile).

Analysis.—Calcd. for $C_{25}H_{33}NO_2$ (percent): C, 79.1; H, 8.8; N, 3.7. Found (percent): C, 79.0; H, 8.7; N, 3.5.

EXAMPLE 13

5-hydroxy-7-(2-octyl)-4-(4-pyridyl) coumarin

To a mixture of ethyl isonicotinoylacetate (25.1 g., 0.13 mole) and 5-(2-octyl)resorcinol (29.0 g., 0.13 mole) was added concentrated sulfuric acid (60 ml.) and phosphoryl chloride (36 ml.) at 0–5° C. The mixture was stirred for 17 hours at room temperature and worked up as in Example 4 to give 5-hydroxy-7-(2-octyl)-4-(4-pyridyl) coumarin (37.92 g., 82%), M.P. 203–205° C. ex aqueous ethanol.

Analysis.—Calcd. for $C_{22}H_{25}NO_3$ (percent): C, 75.2; H, 7.2; N, 3.9. Found (percent): C, 75,1; H, 7.3; N, 3.9.

EXAMPLE 14

2,2-dimethyl-7-(2-octyl)-4-(4-pyridyl)-2H-chromen-5-ol

A solution of 5-hydroxy-7-(2-octyl)-4-(4-pyridyl) coumarin (10.1 g., 0.03 mole) in dry benzene (100 ml.) was added dropwise to a stirred solution of methyl magnesium bromide (0.3 mole) in dry ether (150 ml.). Following the procedure outlined in Example 7 there was obtained 2,2-dimethyl-7-(2-octyl) - 4 - (4-pyridyl)-2H-chromen-5-ol (3.8 g., 36%), M.P. 152–154° C. ex acetonitrile.

Analysis.—Calcd. for $C_{24}H_{31}NO_2$ (percent): C, 78.9; H, 8.55; N, 3.8. Found (percent): C, 78.5; H, 8.6; N, 3.7.

EXAMPLE 15

5-hydroxy-7-(3-nonyl)-4-(4-pyridyl) coumarin

To a mixture of ethyl isonicotinoylacetate (24.7 g., 0.127 mole) and 5-(3-nonyl)-resorcinol (30.0 g., 0.127 mole) was added concentrated sulfuric acid (60 ml.) and phosphoryl chloride (36 ml.) at 0–5° C. The mixture was stirred for 18 hours at room temperature and worked up as in Example 4 to give 5-hydroxy-7-(3-nonyl)-4-(4-pyridyl) coumarin (31.0 g., 67%), M.P. 219–221° C. ex aqueous ethanol.

Analysis.—Calcd. for $C_{23}H_{27}NO_3$ (percent): C, 75.6; H, 7.4; N, 3.8. Found (percent): C, 75.5; H, 7.6; N, 3.8.

EXAMPLE 16

2,2-dimethyl-7-(3-nonyl)-4-(4-pyridyl)-2H-chromen-5-ol

A solution of 5-hydroxy-7-(3-nonyl)-4-(4-pyridyl) coumarin (18.35 g., 0.05 mole) in dry benzene (150 ml.) was added dropwise to a stirred solution of methyl magnesium bromide (0.5 mole) in dry ether (200 ml.). Following the procedure outlined in Example 7 there was obtained 2,2-dimethyl-7-(3-nonyl) - 4 - (4-pyridyl)-2H-chromen-5-ol (8.25 g., 33.5%) isolated as the hemihydrate, M.P. 141–142° C. ex acetonitrile.

Analysis.—Calcd. for $C_{25}H_{33}NO_2 \cdot \frac{1}{2}H_2O$ (percent): C, 77.3; H, 8.8; N, 3.6. Found (percent): C, 77.5; H, 8.8; N, 3.5.

EXAMPLE 17

2,2-diethyl-7-n-heptyl-4-(4-pyridyl)-2H-chromen-5-ol 7-n-heptyl - 5 - hydroxy-4-(4-pyridyl) coumarin (described in Example 6) (6.75 g., 0.02 mole) was added portionwise to a stirred solution of ethyl magnesium bromide (0.06 mole) in dry ether (120 ml.). The mixture was stirred at room temperature for 1 hour and then decomposed by pouring into a solution of ammonium chloride. The organic layer was separated, dried (MgSO$_4$) and evaporated to give a yellow solid which on crystallization from carbon tetrachloride gave the intermediate triol (1.75 g.), M.P. 161–162° C. This intermediate was heated under reflux in glacial acetic acid for 1 hour, cooled and poured into water to give 2,2-diethyl-7-n-heptyl-4-(4-pyridyl)-2H-chromen-5-ol (0.9 g., 12%) isolated as the hemihydrate, M.P. 121–122° C. (acetonitrile).

11

*Analysis.*—Calcd. for $C_{25}H_{33}NO_2\cdot\frac{1}{2}H_2O$ (percent): C, 77.3; H, 8.8; N, 3.6. Found (percent): C, 76.9; H, 8.6; N, 3.6.

EXAMPLE 18

2,2-dimethyl-7-n-heptadecyl-4-(4-pyridyl)-2H-chromen-5-ol

Methyl iodide (28.4 g., 0.2 mole) in dry ether (15 ml.) was added dropwise to a stirred suspension of magnesium turnings (4.6 g., 0.2 mole) in dry ether (125 ml.) under a stream of nitrogen. When all the magnesium had reacted the 7-n-heptadecyl - 5 - hydroxy-4-(4-pyridyl) coumarin (9.54 g., 0.02 mole) was added wthout solvent over ½ hour. When the addition was complete the mixture was stirred at room temperature for 1 hr.

The mixture was poured into a saturated solution of ammonium chloride and extracted with ether. The extract was washed with water, dried ($MgSO_4$) and evaporated. The residue (8.45 g.) was dissolved in glacial acetic acid (50 ml.) and heated under reflux for 1 hr. After cooling, the dark liquid was poured with stirring into sodium carbonate solution and the precipitate collected and crystallized from methanol to give 2,2-dimethyl-7-n-heptadecyl-4-(4-pyridyl)-2H-chromen - 5 -ol (4.88 g., 50%), M.P. 120–121° C.

*Analysis.*—Calcd. for $C_{33}H_{49}NO_2$ (percent): C, 80.65; H, 10.0; N, 2.85. Found (percent): C, 80.5; H, 10.0; N, 2.7.

The intermediate 7-n-heptadecyl-5-hydroxy - 4 - (4-pyridyl) coumarin was prepared by adding concentrated sulphuric acid (30 ml.) and phosphoryl chloride (18 ml.) at 0–5° C. to a mixture of ethyl isonicotinoylacetate (9.7 g., 0.05 mole) and 5-n-heptadecylresorcinol (17.4 g., 0.05 mole) and stirring the mixture for 17 hours at room temperature and then working it up as in Example 4 to obtain the 7-n-heptadecyl-5-hydroxy-4-(4-pyridyl) coumarin (11.9 g., 50% yield) of M.P. 117–118° C. (ethanol).

*Analysis.*—Calcd. for $C_{31}H_{43}NO_3$ (percent): C, 78.0; H, 9.0; N, 2.9. Found (percent): C, 77.7; H, 9.1; N, 3.0.

EXAMPLE 19

5-acetoxy-2,2-dimethyl-7-(2-octyl)-4-(4-pyridyl)-2H-chromene 2,2 - dimethyl-7-(2-octyl)-4-(4-pyridyl)-2H-chromen-5-ol (10.95 g., 0.03 mole), anhydrous sodium acetate (3.0 g.) and acetic anhydride (60 ml.) were heated together under reflux for 2 hours. After cooling, the mixture was stirred with water (200 ml.) and extracted with ether. The ethereal extract was washed with sodium carbonate solution, washed with water, dried and evaporated to yield a pale brown oil. Distillation of this material gave the acetate (10.0 g.; 82%), B.P. 206–208°/0.8 mm.

*Analysis.*—Calcd. for $C_{26}H_{33}NO_3$ (percent): C, 76.7; H, 8.1; N, 3.4. Found (percent): C, 76.8; H, 8.3; N, 3.4.

EXAMPLE 20

The hemisuccinate of 2,2-dimethyl-7-n-pentyl-4-(4-pyridyl)-2H-chromen-5-ol 2,2-dimethyl-7-n-pentyl - 4 - (4-pyridyl)-2H-chromen-5-ol (0.323 g., 0.001 mole) and succinic anhydride (0.1 g., .001 mole) were treated together in a sealed tube at 150–170° C. for 8 hours. After cooling, the glassy product was triturated with ether and the insoluble material collected by filtration. Crystallization from ethanol gave the hemisuccinate (0.11 g., 26%), M.P. 161–162° C.

*Analysis.*—Calcd. for $C_{25}H_{29}NO_5$ (percent): C, 70.9; H, 6.9; N, 3.3. Found (percent): C, 71.0; H, 6.9; N, 3.3.

EXAMPLE 21

Diethylaminoethyl ether of 2,2-dimethyl-7-n-pentyl-4-(4-pyridyl)-2H-chromen-5-ol 2,2 - dimethyl - 7 - n-pentyl-4-(4-pyridyl)-2H-chromen-5-ol (3.23 g., 0.01 mole) in absolute ethanol (5 ml.) was treated with a solution of sodium (0.23 g., 0.01 g. atom) in absolute ethanol (5 ml.). The ethanol was removed in vacuo to yield the sodium salt of the chromen-5-ol. The salt was suspended on dry benzene (10 ml.) and stirred during the dropwise addition of diethylaminoethyl chloride (2.71 g., 0.02 mole). When the addition was complete the mixture was refluxed for 2 hrs., cooled and extracted with water to remove sodium chloride. After drying ($MgSO_4$) the benzene was removed in vacuo to yield the crude basic ether as a viscous oil.

Treatment of a solution of the crude material in dry ether with ethereal hydrogen chloride gave the diethyl aminoethyl ether as the dihydrochloride (2.85 g., 58%) which crystallized from acetone-ethanol mixture as the monohydrate of M.P. 182–183° C.

*Analysis.*—Calcd. for $C_{27}H_{42}Cl_2N_2O_3$ (percent): C, 63.2; H, 8.2; Cl, 13.85; N, 5.5. Found (percent): C, 63.4; H, 8.1; Cl, 13.5; N, 5.2.

EXAMPLE 22

Diethylaminoethyl ether of 2,2-dimethyl-7-(3-methyl-2-octyl)-4-(4-pyridyl)-2H-chromen-5-ol Using the method described under Example 21 there was prepared the diethylaminoethyl ether dihydrochloride (35%) which crystallized from acetone-ethanol mixture as the monohydrate of M.P. 182–184° C.

*Analysis.*—Calcd. for $C_{31}H_{50}Cl_2N_2O_3$ (percent): C, 65.4; H, 8.8; Cl, 12.5; N, 4.8. Found (percent): C, 65.8; H, 8.6; Cl, 12.2; N, 4.9.

EXAMPLE 23

Diethylaminoethyl ether of 2,2-dimethyl-7-(2-octyl)-4-(4-pyridyl)-2H-chromen-5-ol Using the method described under Example 21 there was prepared the diethylaminoethyl ether dihydrochloride (65%) which crystallized from acetone-ethanol mixture as the monohydrate of M.P. 186–187° C.

*Analysis.*—Calcd. for $C_{30}H_{48}Cl_2N_2O_3$ (percent): C, 64.9; H, 8.6; Cl, 12.8; N, 5.0. Found (percent): C, 64.4; H, 8.8; Cl, 13.0; N, 5.3.

The compounds of Examples 21, 22 and 23 were all highly soluble in water.

In analogous manner, compounds can be made in which the 7-cycloalkyl part of 7-cycloalkyl-lower-alkyl is cyclopropyl, cyclobutyl, cyclohexyl and cyclooctyl by substituting the appropriate resorcinols for those set forth above. In this way, from such coumarins there are obtained compounds such as 2,2-dimethyl-7-methyl- or -ethyl-cyclohexyl-4-(4-pyridyl)-2H-chromen-5-ol and the 7-methyl-cyclopropyl, -methyl-cyclobutyl, -methyl- or -ethyl-cycloheptyl and -methyl-cyclooctyl analogs thereof as well as other alkylcycloalkyl or cycloalkylalkyl derivatives.

Compounds of the invention wherein, for example, X is —ONa or —OK instead of —OH are prepared in essentially the same manner as compounds (I) and (II) above but by converting the —OH group to alkali metal salt form with a solution of NaOH or KOH, respectively. This is preferably and most simply carried out on a compound (II). For example, compound (II), wherein the substituents $R_1$ are both methyl and the substituent $R_2$ is methyloctyl, has been converted into the sodium salt in which X is ONa. The 2,2-dimethyl-5-hydroxy-7-methyloctyl compound is reacted with sodium methoxide, refluxed for 1 hour and then evaporated to dryness, the product being a yellowish powder having a melting point of 171 to 176° C. and being non-crystalline. The sodium salt is soluble in ether, but is only extremely slightly soluble in water and for all practical purposes is water insoluble. The sodium salt can be made also by using sodium hydride or sodium hydroxide in place of sodium methoxide. The thus produced sodium salt has the formula:

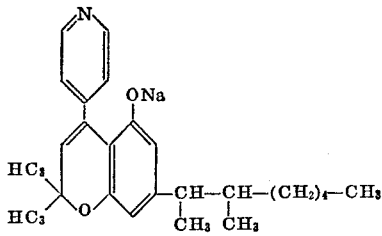

What is claimed is:
1. A compound having the formula:

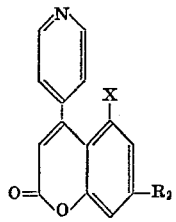

wherein:
X is hydroxy, an alkali metal or alkaline earth metal derivative thereof or a lower-alkyl ether derivative thereof;
$R_2$ is an alkyl group having 1–20 carbon atoms, cycloalkyl having 3 to 8 carbon atoms or cycloalkyl-lower-alkyl wherein the cyclo-alkyl part has 3 to 8 carbon atoms.

2. The compound of claim 1 which is 5-hydroxy-7-(3-methyl-2-octyl)-4-(4-pyridyl) coumarin.

3. The compound of claim 1 which is 5-hydroxy-7-methyl-4-(4-pyridyl) coumarin.

4. The compound of claim 1 which is 7-n-heptyl-5-hydroxy-4-(4-pyridyl) coumarin.

5. The compound of claim 1 which is 5-hydroxy-7-n-pentyl-4-(4-pyridyl) coumarin.

6. The compound of claim 1 which is 5-hydroxy-7-n-nonyl-4-(4-pyridyl) coumarin.

7. The compound of claim 1 which is 5-hydroxy-7-(2-octyl)-4-(4-pyridyl) coumarin.

8. The compound of claim 1 which is 5-hydroxy-7-(3-nonyl-4-(4-pyridyl) coumarin.

9. The compound of claim 1 which is 7-n-heptadecyl-5-hydroxy-4-(4-pyridyl) coumarin.

10. The compound of claim 1 which is 7-cyclohexyl-5-hydroxy-4-(4-pyridyl) coumarin.

11. The compound of claim 1 which is 7-cyclopropyl-5-hydroxy-4-(4-pyridyl) coumarin.

12. The compound of claim 1 which is 7-cyclobutyl-5-hydroxy-4-(4-pyridyl) coumarin.

13. The compound of claim 1 which is 7-cycloheptyl-5-hydroxy-4-(4-pyridyl) coumarin.

14. The compound of claim 1 which is 7-cyclooctyl-5-hydroxy-4-(4-pyridyl) coumarin.

References Cited

UNITED STATES PATENTS 3,235,598   2/1966   Moffett _____ 260—570.7

ALAN L. ROTMAN, Primary Examiner

U.S. Cl. X.R.

260—297 B, 295 S; 424—263, 266